United States Patent
Koziolek et al.

(10) Patent No.: US 11,966,731 B2
(45) Date of Patent: Apr. 23, 2024

(54) METHOD FOR REAL-TIME UPDATING OF PROCESS SOFTWARE

(71) Applicant: ABB Schweiz AG, Baden (CH)

(72) Inventors: Heiko Koziolek, Karlsruhe (DE); Andreas Burger, Weingarten (DE); Julius Rueckert, Langen (DE); Pablo Rodriguez, Ilvesheim (DE); Staffan Andersson, Lund (SE)

(73) Assignee: ABB Schweiz AG, Baden (CH)

( * ) Notice: Subject to any disclaimer, the term of this patent is extended or adjusted under 35 U.S.C. 154(b) by 84 days.

(21) Appl. No.: 17/703,357

(22) Filed: Mar. 24, 2022

(65) Prior Publication Data
US 2022/0308859 A1    Sep. 29, 2022

(30) Foreign Application Priority Data
Mar. 25, 2021  (EP) .................................. 21164956

(51) Int. Cl.
*G06F 9/50*   (2006.01)
*G06F 8/61*   (2018.01)
(Continued)

(52) U.S. Cl.
CPC .................. *G06F 8/65* (2013.01); *G06F 8/61* (2013.01); *G06F 9/544* (2013.01);
(Continued)

(58) Field of Classification Search
CPC ... G06F 8/65; G06F 8/61; G06F 9/544; G06F 9/5077; G06F 9/4856; G06F 9/5072; G06F 9/542; G06F 11/3006
See application file for complete search history.

(56) References Cited

U.S. PATENT DOCUMENTS 9,621,631 B2   4/2017 Zises
9,813,520 B2   11/2017 Erickson
(Continued)

FOREIGN PATENT DOCUMENTS

EP        3702916 A1    9/2020
WO  WO 2007/100292 A1  9/2007

OTHER PUBLICATIONS

Nicholas Ayres et al., Continuous Automotive Software Updates through Container Image Layers, 2021, [Retrieved on Nov. 15, 2023]. Retrieved from the internet: <URL: https://www.mdpi.com/2079-9292/10/6/739> 17 Pages (1-17) (Year: 2021).*

(Continued)

*Primary Examiner* — Anibal Rivera
(74) *Attorney, Agent, or Firm* — Leydig, Voit & Mayer, Ltd.

(57) ABSTRACT

A system and method for real time updating of process applications includes a first execution engine executing a first process application to control a process device, an update manager receiving an updated software, the update manager being a second software container deployed in the deployment unit; initializing the updated software in a second execution engine; determining an application state of the first process application; instructing a transfer of the application state from the first execution engine to the second execution engine; instructing the second execution engine to execute the updated process application using the received application state; and instructing the first execution engine to stop writing output signals for the process device, and instructing the second execution engine to write output signals for the process device.

12 Claims, 3 Drawing Sheets

(51) Int. Cl.
  *G06F 8/65* (2018.01)
  *G06F 9/48* (2006.01)
  *G06F 9/54* (2006.01)
  *G06F 11/30* (2006.01)
(52) U.S. Cl.
  CPC ........ *G06F 11/3006* (2013.01); *G06F 9/4856* (2013.01); *G06F 9/5072* (2013.01); *G06F 9/5077* (2013.01); *G06F 9/542* (2013.01)

(56) References Cited

U.S. PATENT DOCUMENTS

| | | | |
|---|---|---|---|
| 10,031,489 | B2 | 7/2018 | Nixon et al. |
| 10,268,508 | B1 | 4/2019 | Hauser et al. |
| 2018/0246715 | A1 | 8/2018 | Regmi et al. |
| 2018/0314515 | A1 | 11/2018 | de Kruijf et al. |
| 2020/0278874 | A1* | 9/2020 | Andersson ................ G06F 9/52 |
| 2021/0342232 | A1* | 11/2021 | Gopalan ............. G06F 11/1451 |
| 2022/0091572 | A1* | 3/2022 | Biernat ................ G06F 9/5083 |
| 2022/0091583 | A1* | 3/2022 | Biernat ................ G06F 9/45558 |
| 2022/0091899 | A1* | 3/2022 | Biernat ................ G06F 9/5077 |

OTHER PUBLICATIONS

Cheng et al., "Geelytics: Geo-distributed Edge Analytics for Large Scale IoT Systems Based on Dynamic Topology," *2015 IEEE 2nd World Forum on Internet of Things (WF-IoT)*, IEEE, 6 pp. (2015).

Yigitoglu et al., "Foggy: A Framework for Continuous Automated IoT Application Deployment in Fog Computing," *2017 IEEE international conference on AI & Mobile Services (AIMS)*, IEEE, 8 pp. (2017).

European Patent Office, Extended European Search Report in European Patent Application No. 21164956.1, 12 pp. (dated Aug. 31, 2021).

* cited by examiner

METHOD FOR REAL-TIME UPDATING OF PROCESS SOFTWARE

CROSS-REFERENCE TO RELATED APPLICATIONS

This patent application claims priority to European Patent Application No. EP21164956.1, filed on Mar. 25, 2022, which is incorporated herein in its entirety by reference.

FIELD OF THE DISCLOSURE

The present disclosure generally relates to process automation and, more particularly, to process automation in industrial plants.

BACKGROUND OF THE INVENTION

In process automation, process applications, in particular, control applications to calculate outputs for actuators, are based on sensor data. They execute periodically with cycle times of, for example. 100 ms, 10 ms, and even down to 1 ms in extreme cases. Such applications need to be updated, in particular to optimize the production efficiency, correct faults, apply security updates or comply with new standards. However, stopping the application for an update is undesirable to avoid production stops, especially in case of minor adjustments to the control code.

Application execution engines, executing the applications, run in separate software containers, for example Docker containers, rkt container, LXD containers, so that they can be managed by a container orchestration engine, for example Kubernetes, Docker Swarm, Nomad. This brings many benefits in managing and controlling the software. However, the orchestration engine may deploy each container on a different physical node therefore introducing undesired network latencies in case of state transfers. In this case, different deployment units (e.g., Kubernetes pods, Podlike for Docker Swarm) can only communicate via network sockets, thereby introducing latency.

The applications carry a state, for example, internal counters or internal timers. The updated application needs to be initialized with the exact state of the first application, so that it can output the same results or, in case of logic changes, slightly different results.

The state transfer must happen comparably fast, well-below the cycle times. Especially the state transfer needs to be completed in the remaining time after the control application execution ends and until the next cycle of execution starts. The state transfer requires the internal state to be transferred between the applications, thus a transmission over a network, physical or virtual, is undesired, because of the added delay of network protocols at multiple layers of the network stack.

BRIEF SUMMARY OF THE INVENTION

The present disclosure describes a method that allows real-time updating of process software. This objective is achieved by the subject-matter of the independent claims. Further preferred embodiments are evident from the dependent patent claims.

According to an aspect of the disclosure, a method for real-time updating of process software is provided, comprising the following steps. In a step a first process application is executed by a first execution engine, thereby controlling a process device, wherein the first execution engine is a first software container deployed in a deployment unit, wherein software containers of the deployment unit are deployed on a single physical host node. In another step, an updated software, wherein the updated software comprises an updated process application, being an updated version of the first process application, and/or an updated execution engine, being an updated version of the first execution engine, is received by an update manager, wherein the update manager is a second software container deployed in the deployment unit. In another step, the updated process application is initialized by the update manager in a second execution engine, wherein the second execution engine is a third software container deployed in the deployment unit. In another step, an application state of the first process application is determined by the update manager. In another step, a transfer of the application state from the first execution engine to the second execution engine via inter-process communication is instructed by the update manager. In another step, the second execution engine instructed by the update manager to execute the updated process application using the received application state. In another step, the first execution engine is instructed by the update manager to stop writing output signals for the process device and instructing the second execution engine to write output signals for the process device.

BRIEF DESCRIPTION OF THE SEVERAL VIEWS OF THE DRAWING(S)

Embodiments of the present disclosure will be explained in more detail in the following text with reference to preferred exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF THE INVENTION

Figure 1:
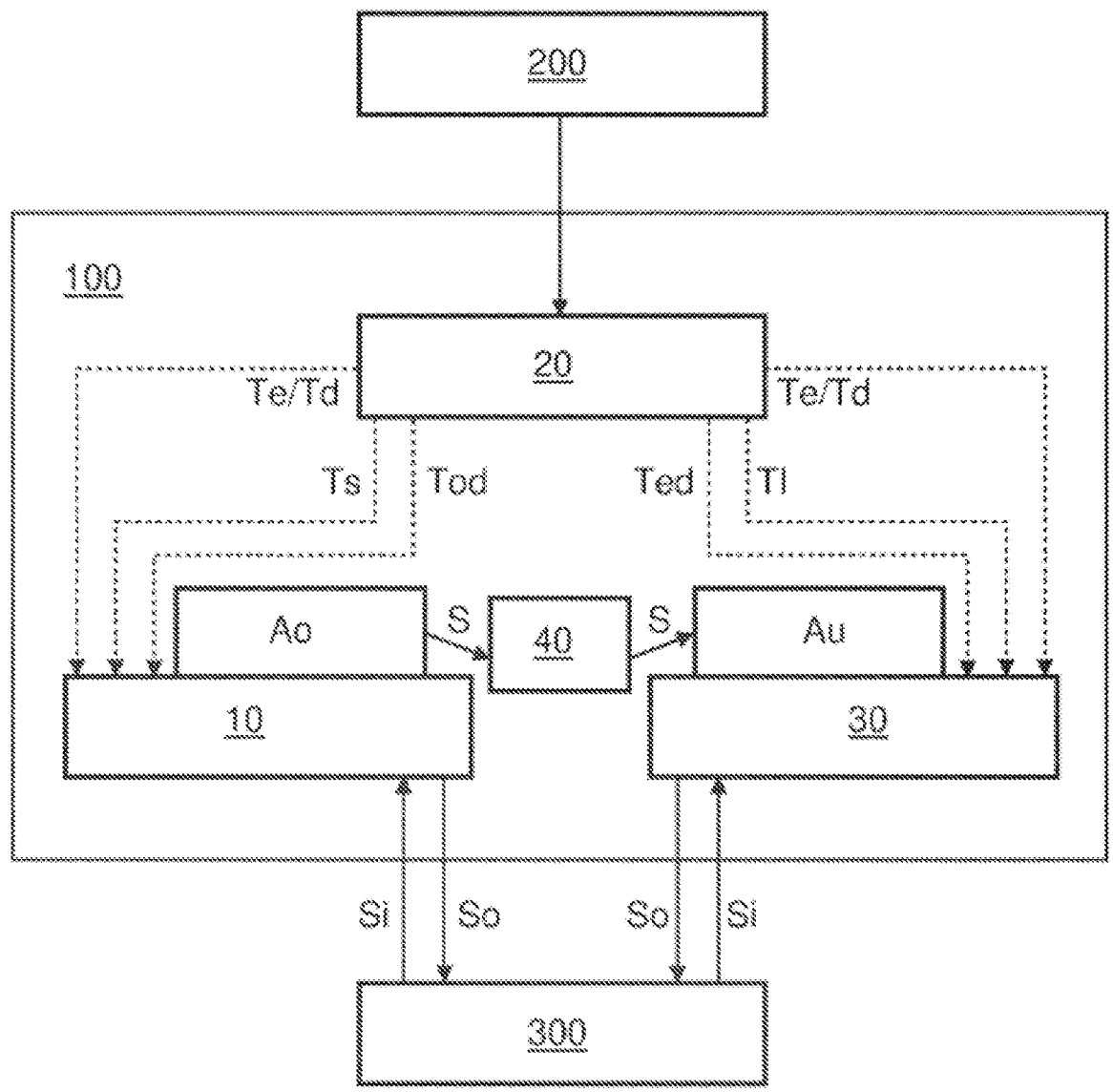
FIG. 1 is a schematic representation of a system for real time updating of process software in accordance with the disclosure.

FIG. 1 schematically shows a system for real time updating of process software, in this case for updating a process application. The system comprises an application engineering tool 200, a container deployment unit 100 and a process device 300. The application engineering tool 200 is connected to the process device 300 via the container deployment unit 100. The application engineering tool 200 comprises an application engineering software that is used by application engineers to implement process applications. In this case, the application engineering tool 200 is used to roll out an updated version of a process application that controls the process device 300. Thus, the application engineering tool 200 provides an updated process application Au, in particular in form of an XIVILM-file, to the container deployment unit 100, in particular to an update manager 20 of the container deployment unit 100.

It should be appreciated that the embodiments described herein can be embodied as computer code or computer executable instructions that exist in non-tangible storage media and that are executed on a computer having at least a processor, memory, input and output devices for exchanging information with users and/or other computer systems and the like. Alternatively, the computer programs described herein can be executed on a cloud computing platform having all capabilities that are known to those of skill in the art.

The container deployment unit 100 is configured to host at least one application execution engine, in particular, embodied as a software container. Software containers, which are hosted by the same container deployment unit 100, share the same inter-process communication namespace and thus allow inter-process communication between the software containers. In this case, the container deployment unit 100 hosts a first execution engine 10 that is configured for running a first process application Ao. The first process application Ao is provided by input signals Si from the process device 300. The input signals Si for example comprise sensor data from the process device 300. using the input signals Si, the first process application Ao provides output signals So that are provided back to the process device 300. The output signals So for example comprise control data adjusting a valve of the process device 300. In other words, the first process application Ao executed by the first execution engine 10, being a software container, controls the process device 300.

Furthermore, the container deployment unit 100 is configured to host the update manager 20, being a software container. The update manager 20 is configured to coordinate and execute an update process of the first process application Ao. The update manager 20 is configured for providing trigger signals to other software containers, triggering actions for the update process.

During the update process, the update manager is also configured for initializing a second execution engine 30, being a software container. The second execution engine 30 is configured for executing the updated process application Au that has been provided to the update manager 20.

As the first execution engine 10 and the second execution engine 30 are hosted on the single container deployment unit 100, a shared memory 40 can be used for inter-process communication between the first execution engine 10 and the second execution engine 30. In order to achieve a real-time update of the first process application 10, time critical steps of the update process have to be executed during a cycle time of the first process application 10. The cycle time is defined by the first process application 10 itself and defines the time frame in which the first process application 10 periodically receives input signals Si from the process device 300. This cycle time might lie in a time window of smaller than 10 milliseconds.

The update manager 20 is thus configured for providing a disable trigger Td to the first execution engine 10 that instructs the first execution engine 10 to stop, or in other words pause, the execution of the first process application Ao. The update manager 20 is further configured for providing a save trigger Ts to the first execution engine. The save trigger Ts instructs the first execution engine 10 to save an application state S of the first process application Ao to the shared memory 40. The application state S comprises process variables, for example counters, that are necessary for the updated process application Au to continue controlling the process device 300, when the first process application Ao is finally deactivated. The update manager 20 is further configured for providing a load trigger Tl to the second execution engine 30. The load trigger Tl instructs the second execution engine 30 to load the application state S from the share memory. Due to the nature of inter-process communication established by the shared memory 40, the steps of storing the applications state S to the shared memory 40 and loading the application state S from the shared memory can be executed extremely fast, in particular within fractions of a millisecond. The update manager 20 is configured for providing an enable trigger Te to the second execution engine 30 that instructs the second execution engine 30 to execute the updated process application 30.

The update manager 20 is further configured for providing an output disable trigger Tod to the first execution engine 10. The output disable trigger Tod instructs the first execution engine 10 to disable writing output signals So to the process device 300. On the other hand, the update manager 20 is configured for providing an output enable trigger Toe to the second execution engine 30. The output enable trigger Ted instructs the second execution engine 30 to enable writing output signals So to the process device 300. In other words, the second execution engine 30 is configured for executing the updated process application Au using the loaded application state S and the input signals Si of the process device 300 to determine output signals So that are provided to the process device 300 for controlling the process device 300.

Figure 2:
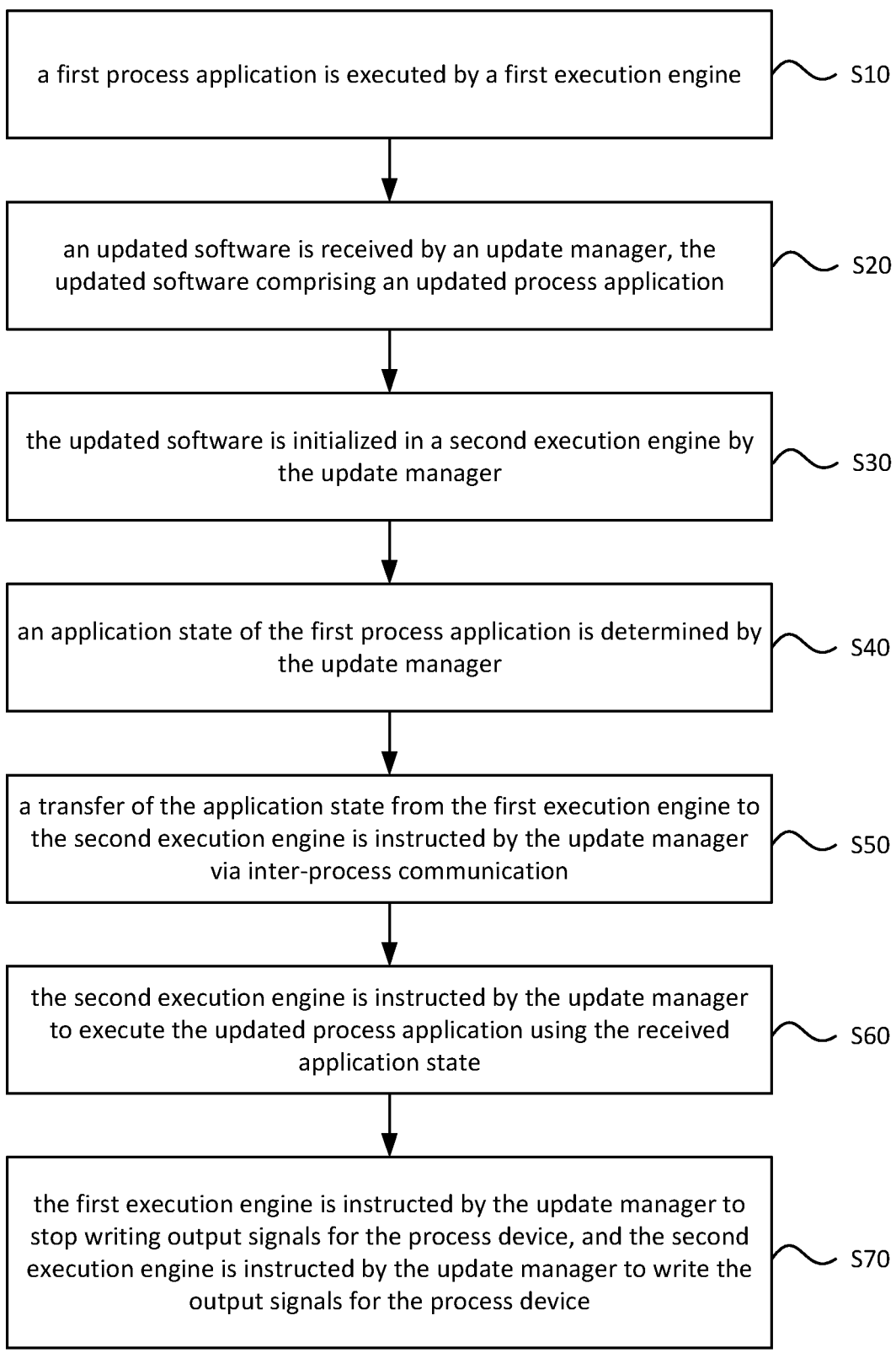
FIG. 2 is a schematic representation of a flowchart for a method for real time updating of process software in accordance with the disclosure.

FIG. 2 schematically shows a method for real time updating of process software. In a step S10, by a first execution engine 10, a first process application Ao is executed, thereby controlling a process device 300, wherein the first execution engine 10 is a first software container deployed in a deployment unit 100, wherein software containers of the deployment unit 100 are deployed on a single physical host node. In another step S20, by an update manager 20, an updated software is received, wherein the updated software comprises an updated process application Au, being an updated version of the first process application Ao, and/or an updated execution engine, being an updated version of the first execution engine 10. The update manager 20 is a second software container deployed in the deployment unit 100. In another step S30, by the update manager 20, the updated software is initialized in a second execution engine 30, wherein the second execution engine 30 is a third software container deployed in the deployment unit 100. In another step S40, by the update manager 20, an application state S of the first process application Ao is determined. In another step S50, by the update manager 20, a transfer of the application state S from the first execution engine 10 to the second execution engine 30 is instructed via inter-process communication. In another step S60, by the update manager 20, the second execution engine 30 is instructed to execute the update using the received application state S. In another step S70, by the update manager, the first execution engine 10 is instructed to stop writing output signals So for the process device 300, and instructing the second execution engine 30 to write output signals So for the process device 300.

Figure 3:
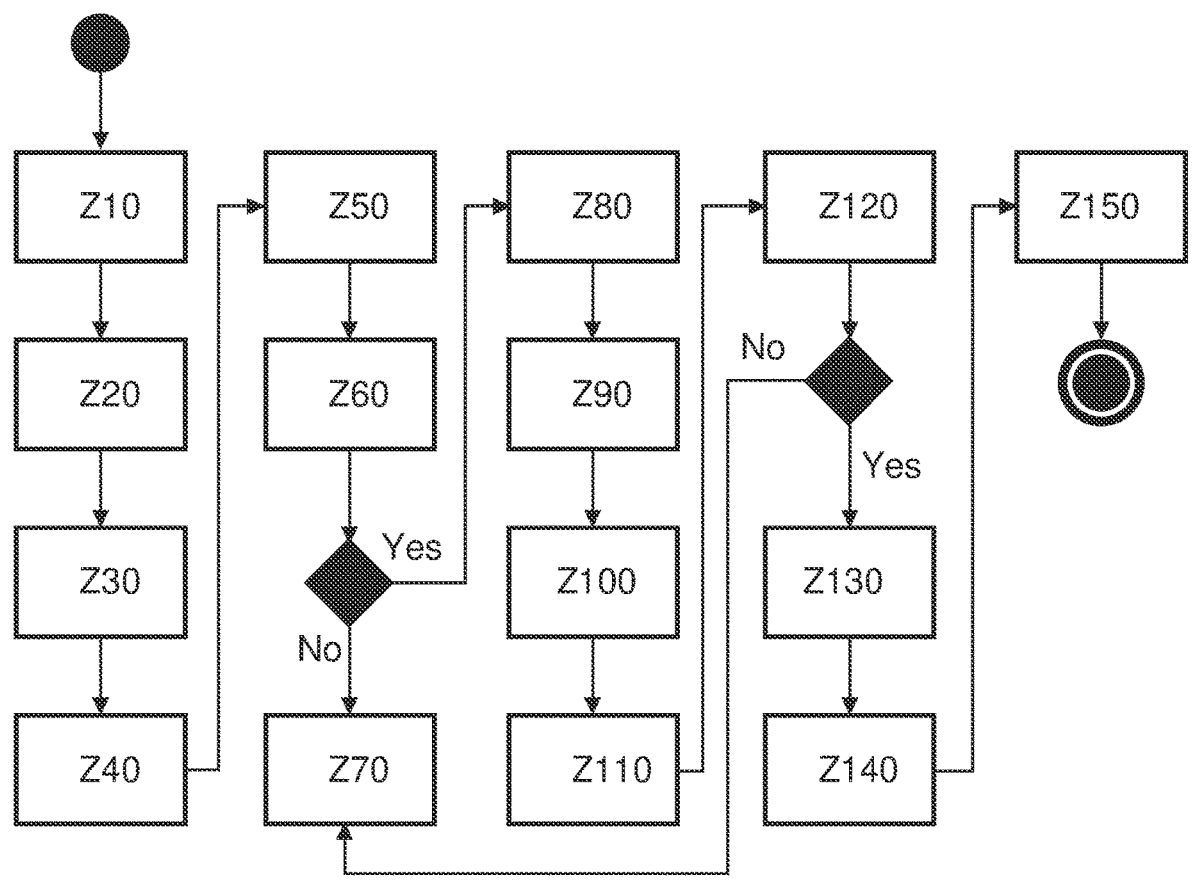
FIG. 3 is a schematic representation of a flowchart for an alternative method for real time updating of process software in accordance with the disclosure.

FIG. 3 schematically shows another method for real time updating of process software, in this case process applications. In step Z10, the application engineering tool 200 triggers an upload manager with an updated process application Au to be uploaded. The updated process application Au is for example transferred as a text file like XML, via a network connection to the update manager 20. This step is not time critical.

In step Z20, the update manager 20 starts a software container, which is also called application container, with a second execution engine 30. Alternatively, the update manager 20 starts an updated version of the second execution engine 30 that has at least the same capabilities as the first execution engine 10. The update manager 20 waits for the second execution engine 30 to be fully initialized.

In step Z30, the update manager 20 loads the updated process application Au into the second execution engine 30. The second execution engine 30 initializes its internal data structures accordingly and is afterwards ready for execution. This step is also not time critical.

In step Z40, the update manager 20 enables the process device 300, in particular sensors or actuators, to send input signals Si, being the signal values required for the process application execution also to the second execution engine 30, in addition to sending them to the first execution engine 10. This is for example achieved by re-configuring gateways providing the input signals Si. Alternatively, the update manager sets up an open platform communications unified architecture, OPC UA, client/server or Pub/Sub subscription from the second execution engine 30 to these input signals Si. The latter might for example involve communicating with a message broker or listening to a multicast IP address.

In step Z50, the update manager prepares a transfer of the application state S from first execution engine 10 to the second execution engine 30. The update manager 20 filters the application state S of the first process application Ao for variables that are automatically marked or marked by automation engineers as retained variables in the application engineering tool 200. These variables are necessary to be transferred to allow a correct execution of the control logic. Other variables can be omitted, as they do not critically interfere with the application logic. Filtering the list of state variables of the application state S reduces the required memory sizes and thus enables a faster state transfer. If no variables are marked as retained variables, the update manager simply creates a list of all state variables of the loaded program, in this case the first process application Ao. The filtering of the application state S for retained variables can alternatively also already be carried out in Step Z20, before download of the updated process application Au. In this case, the filtered list can be used also for other uses cases, such as redundant failover.

In step Z60, a feasibility of the state transfer is checked by the update manager 20. Alternatively, the pre-check can also be executed before starting the second execution engine 30 in step Z20.

In step Z70, if the state-transfer pre-check fails, the update manager 20 aborts the update attempt, stops the containers of the second execution engine 30 and informs the user with an error message. The error message preferably contains information why the pre-check failed, and which steps would be required to fulfil the requirements for a successful pre-check. Optionally, it can be interacted with the container orchestration environment to determine if non-critical deployment units running in the same node might be migrated to other nodes to free enough resources to enable a successful state transfer. The user could then decide if such migrations are desired and trigger them. Afterwards, a new pre-check would be executed.

In step Z80, in case, the state-transfer pre-check is successful, a series of time-critical steps Z80-Z11 starts. First, the update manager pauses the execution of the first execution engine 10 via a trigger signal, the disable trigger Td. This prevents overwriting variables that are part of the application state S to transfer. The second execution engine 30 has not yet started the execution and can thus not interfere with the variables of the application state S.

In step Z90, the update manager 20 triggers, in this case by the store trigger Ts, the first execution engine 10 to retrieve the formerly marked variables that form the application state S to be transferred from the update manager 20. These variables are then exposed via the shared memory 40. Preferably, the first execution engine 10 compresses the variables of the application state S, before copying them to the shared memory 40. Meta-data about the variables are well suited for compression, especially if executed on fast hardware. The compression thus reduces the time for the state transfer further. After a successful retrieval of the variables, the first execution engine 10 resumes its execution and compensates for the time it took to extract, or in other words store, the application state S. This way, the cycle time remains correct and the external process does not notice any misses of cycle times. When the first execution engine 10 resumes execution, the update manager immediately instructs the second execution engine 30 to buffer all incoming input values until the transfer of the application state S is completed. This avoids missing input updates during the state transfer.

In step Z100, the update manager 20 triggers the second execution engine 30 to load and decompress the variables forming the application state S from the shared memory 40. This is only possible since the software containers of the first execution engine 10 and the second execution engine 30 are in the same deployment unit 100, otherwise only network communication would be possible between them, which would add latency. The time for executing step Z90 and Z100 must be well below the configured cycle time, for example 20 ms, so that the execution cycle required by the controlled process of the process device 300 is kept and not missed. In particular, the time needs to be smaller than the cycle time reduced by the execution time of the first process application Ao. If the cycle time is 20 ms and the application execution takes 5 ms, the state transfer and loading of the state must happen in 15 ms or less. When resuming the execution of the process application, the transfer and load time is compensated by reducing the remaining wait time until the next execution cycle starts. This way, the execution of both the first execution engine 10 and the second execution engine 30 are synchronized and the cycle time is kept, making the switchover between the first execution engine 10 and the second execution engine 30 transparent to the controlled process of the process device 300.

In step Z110, the update manager 20 sets the second execution engine 30 to running, for example by an enable trigger Te, upon which it copies-in the input signals Si, executes the updated process application Au and thereby calculates the output signals So. This includes the input values buffered during state transfer in step Z90. The output signals So are not yet written back to the process device 300, to first verify the correct calculations. This verification can be done by the user or automatically based on pre-defined rules, which, for example specify a maximum acceptable difference between output values of the first execution engine 10 and the second execution engine 30.

In step Z120, for example the user gets displayed the current values of selected output signals So both from the first execution engine 10 and the second execution engine 30. The users can select or deselect these values. In case of very fast updating signals, the system may provide the user and indirect measure for the "drift" of the output signals So of the first execution engine 10 and the second execution engine 30, for example, the difference between numerical values, or the measured jitter of the execution engines. The values of the output signal So are not necessarily required to be equal in each cycle. Updates to the process application may have changed the logic to compute different values for the output signal So. Furthermore, many process automation applications are not severely affected by a slight cycle clock drift between the execution engines. In this step the user performs the comparisons visually. The user can then initiate the change of the system from the first execution engine 10 to the second execution engine 30, for example by clicking a button, or abort and roll-back the entire update in the correct calculations cannot be verified.

In step Z130, the update manager 20 disables the first execution engine 10 to write the output signals So. This can be achieved by altering the publishing datasets on the first execution engine 10.

In step Z140, the update manager enables the second execution engine 30 to write the output signals So. This can be achieved by altering the publishing datasets on the second execution engine 30.

In step Z150, the update manager deactivates the first execution engine 10, since it no longer contributes to controlling the process device 300. The software container can optionally be archived to allow for subsequent rollbacks of the update in case undesired calculations are encountered later.

In a general aspect, the present disclosure describes a method that allows real-time updating of process software. According to an aspect of the disclosure, a method for real-time updating of process software is provided, comprising the following steps. In a step a first process application is executed by a first execution engine, thereby controlling a process device, wherein the first execution engine is a first software container deployed in a deployment unit, wherein software containers of the deployment unit are deployed on a single physical host node. In another step, an updated software, wherein the updated software comprises an updated process application, being an updated version of the first process application, and/or an updated execution engine, being an updated version of the first execution engine, is received by an update manager, wherein the update manager is a second software container deployed in the deployment unit. In another step, the updated process application is initialized by the update manager in a second execution engine, wherein the second execution engine is a third software container deployed in the deployment unit. In another step, an application state of the first process application is determined by the update manager. In another step, a transfer of the application state from the first execution engine to the second execution engine via inter-process communication is instructed by the update manager. In another step, the second execution engine instructed by the update manager to execute the updated process application using the received application state. In another step, the first execution engine is instructed by the update manager to stop writing output signals for the process device and instructing the second execution engine to write output signals for the process device.

In other words, the updating the process software comprises updating the first process application only and running the updated process application in a second execution engine that is identical to the first execution engine. Furthermore, the updating the process software comprises updating the first execution engine only and running a second process application that is identical to the first process application in an updated execution engine. In addition, the updating the process software comprises updating the first execution engine and the first process application and thus running the updated process application in the updated execution engine.

The term "application state", as used herein, comprises values of variables that have been set by the first process application. The variables comprise internal counters, internal timers, past executions and/or states of a PID loop, but exclude received sensor signals or sent output signals.

The term "process device", as used herein, relates to devices that are used in industrial plants to run production processes. The process device is also referred to as field device.

The term "execution engine", as used herein, comprise a runtime environment capable of cyclic execution of process applications, in particular control logic applications, for example according to IEC 61131-3. The runtime environment receives input signals from process devices periodically. The execution engine executes the process application, in particular control algorithms, on these signals and calculates output signals, which are send back to the process devices.

The term "process application", as used herein, comprises a program resembling a control algorithm, for example a PID controller for the gas flow in a boiler. For example, the process application is implemented using one of the five IEC 61131-3 programming languages (Structured Text, Function Block Diagrams, Instruction Lists, Sequential Function Charts, Ladder Logic). During execution, the process application preferably carries an application state, for example the value of counter variables, intermediate calculations, or timers.

Preferably, the process device comprises a sensor or an actuator.

The term "process device", as used herein, is also referred to as field device. The process devices regulate industrial processes, for example the temperature and flow in an oil pipeline or the filling level of a chemical reactor. The process devices are connected to the container deployment unit, for example via network links, fieldbuses or directly using analog input/output devices. Sensors periodically provide updated sensor values, for example temperature is 70 degrees, while actuators continuously listen to input signals, for example close valve to 20%. There are typically gateways that connect the process devices to the control software that resides on custom-built DCS controllers or servers.

In one embodiment, the update manager runs in a software container and is configured to coordinate the process of updating the process application during runtime.

In order to control the process device, the execution engine receives input signals from the process device and provides output signals that are provided back to the process device.

In one embodiment, the process application comprises a control application used for controlling a process device, in particular for a production process.

The deployment of the first execution engine and the second execution engine in a single deployment unit allows for inter-process communication. Thus, for example remote procedure calls or other means to transfer the application state utilizing a network stack that in general cannot comply with the timing requirements needed for on the fly updating of the process applications can be omitted.

In other words, utilizing a single container deployment unit to host two application execution engines and consequently process applications enables a fast state transfer via inter-process communication, IPC. Only software containers within the same container deployment unit share the same IPC namespace, therefore enabling inter-process communication, for example using SystemV semaphores or POSIX shared memory. This allows relatively fast communication between the software containers, in particular compared to straightforward mapping of each application execution engine to a separate deployment unit, which would prevent using IPC and require using slower (local) network communication.

In one embodiment, the update manager receives an updated execution engine that replaces the first execution engine, for example the first execution engine, by the same means as the update manager updates the first process application. In other words, the mechanism allows updating the execution engine itself on-the-fly for example to upgrade to new features or apply security fixes. For example, known Load-Evaluate-Go approaches executed two versions of the process application in the same execution engine and thus did not allow to update the execution engine itself.

The provided method allows fast internal application state transfer between execution engines.

In one embodiment, the updated process software is received by an update manager, in particular from an application engineering tool. The updated process software, in particular the updated process application, is preferably received as a text time, for example an XML-file. Automation engineers use application engineering tools, or in other words an application engineering software, to implement the process applications. The application engineering tools preferably are desktop or web-based tools that allow an upload of the process applications to a runtime on a controller or server. In this case, the application engineering tool does not directly communicate with the execution engines, but instead transfers the updated process application to the execution engine via the update manager.

In one embodiment, update to process software, in particular process applications and/or execution engines, are possible during runtime without interrupting the underlying process. Thus, a fast state transfer mechanism is provided for containerized control applications with real-time requirements.

The provided method allows for an on-the-fly update mechanism for process applications running in containerized environments, in particular compared to known uncontainerized Load-Evaluate-Go approaches.

The method thus provides on-the-fly updates of process software without affecting a production process of the process device, for example by stopping the process device during the update.

The integration of the application execution into software containers and a container orchestration engine allows faster software delivery through online updates, automatically managed scalability and fault-tolerance, as well as more efficient computing resource usage, in particular compared to virtual machines.

Thus, an improved method for updating a process software in real-time is provided.

In one embodiment, the first process application comprises a predetermined cycle time, wherein the cycle time defines a frequency of periodically executing the first process application and writing output signals for the process device. A time for transferring the application state from the first execution engine to the second execution engine, executing the updated process application and writing the output signals for the process device by the second execution engine within the predetermined cycle time.

Thus, the first process application is updated to the updated process application within one process cycle. In the same way, the first execution engine is updated to the updated execution engine within one process cycle. Consequently, the process devices does not have to be paused.

Furthermore, the process device does not detect any update of its process application and/or execution engine as an exchange of signals between the process application and/or execution engine, original or updated, and the process device stays as expected within the predetermined cycle time.

Thus, an improved method for updating a process software in real-time is provided.

In one embodiment, the predetermined cycle time is smaller than 100 ms.

Preferably, the predetermined cycle time is smaller than 10 milliseconds, further preferably smaller than 1 millisecond.

For some process automation applications, short cycle times for the computation down to 1-10 milliseconds are necessary.

Due to the inter-process communication between the original software, comprising the first process application and the first execution engine, and the updated process software, the method for updating the process software is still executed in real-time without pausing the process device even with extremely short cycle times.

Thus, an improved method for updating a process software in real-time is provided.

In one embodiment, the application state comprises variables that have been set by the first process application during execution.

In order that the updated software is able to continue controlling the process device where the first process application has left controlling the process device, the updated process software needs to be aware of a present state of control of the process device. This information is selected by the application state. In other words, the application state comprises a plurality of variables that are set or changed during execution of the first process application. Those variables are provided to the updated process software.

Thus, an improved method for updating a process software in real-time is provided.

In one embodiment, the inter-process communication between the first execution engine and the second execution engine is provided by using a shared memory (e.g., POSIX Shared Memory using the function shm_open, System V API using shmget, anonymous mapped memory in BSD system, or POSIX memory-mapped files using the mmap API), shared by the first execution engine and the second execution engine.

In one embodiment, initializing the updated process application comprises initializing the second execution engine and transferring the updated process application to the second execution engine.

In one embodiment, initializing the updated process software comprises enabling the second execution engine to read input signals provided by the process device controlled by the first process application.

In one embodiment, the updated process software is provided with input signals of the process device so that in this stage of the update process, the first process application and the updated process application are provided with the same input signals of the process device.

This improves comparing an output of the first process application and the updated process software.

Thus, an improved method for updating a process software in real-time is provided.

In one embodiment, wherein determining the application state comprises filtering the application state for retained variables, being variables that are necessary for a correct execution of the updated process application.

In one embodiment, the update manager identifies the application state to be transferred using hints from an engineering configuration file. For example, the update manager identifies the application state by using retained variables of an IEC 61131-3 control program.

Thus, an improved method for updating a process software in real-time is provided.

In one embodiment, instructing the transfer of the application state from the first execution engine to the second execution engine comprises pausing, by the update manager, the execution of the first process application, instructing, by the update manager, the first execution engine to store the application state on the shared memory, instructing, by the update manager, the second execution engine to load the application state from the shared memory and de-pausing, by the update manager, the execution of the first process application;

In one embodiment, the update manager pauses the execution engines, in particular the first execution engine, during state transfer, so that no values of the application state are overwritten.

Thus, an improved method for updating a process software in real-time is provided.

In one embodiment, storing the application state on the shared memory comprises compressing, by the first execution engine, the application state and storing the compressed application state on the shared memory. Loading the application state from the shared memory comprises loading, by the second execution engine, the compressed application state from the shared memory and decompressing the compressed application state.

Compressing the application state reduces an amount of data to be transferred and consequently reduces a transfer latency.

In typical process automation applications, there are thousands of variables making up the application state, which thus may consume several hundreds of Kilobytes or several Megabytes of memory. Compressing these variables by a factor of 3 to 5 can reduce the required latency further. Very fast compression algorithms (e.g., LZ4 or Zstandard) are preferable for this tasks.

Thus, an improved method for updating a process software in real-time is provided.

In one embodiment, the method comprises the steps of verifying the output signals of the second execution engine based on the output signals of the first execution engine and if it is determined that the output signals of the second execution engine are reliable, instructing, by the update manager, the first execution engine to stop writing output signals for the process device, and instructing the second execution engine to write output signals for the process device, else deactivating, by the update manager, the second execution engine.

In one embodiment, deactivating, by the update manager, the second execution engine comprises aborting the method and in particular providing an abort information to a user. The abort information preferably comprises a warning signal.

Thus, an improved method for updating a process software in real-time is provided.

In one embodiment, the method is a computer-implemented method.

According to another aspect of the invention, a container deployment unit is provided, configured for executing the method, as described herein.

According to another aspect of the invention, a system for real time updating of process applications comprises an application engineering tool, a container deployment unit, as described herein, and a process device. The application engineering tool is configured for providing an updated process software to the container deployment unit. The container deployment unit is configured for controlling the process device. The process device is configured for being controlled by the container deployment unit.

According to another aspect of the invention, a computer program comprises instructions which, when the program is executed by a computer, cause the computer to carry out the method, as described herein.

LIST OF REFERENCE SYMBOLS 100 container deployment unit
10 first execution engine
20 update manager
40 shared memory
30 second execution engine
Ao first process application
Au updated process application
S application state
Si input signal
So output signal
Ts store trigger
Tl load trigger
Te enable trigger
Td disable trigger
Tod output disable trigger
Ted output enable trigger
200 application engineering tool
300 process devices All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for real time updating of process software, comprising the steps:

executing, by a first execution engine, a first process application thereby controlling a process device, wherein the first execution engine is a first software container deployed in a deployment unit, wherein software containers of the deployment unit are deployed on a single physical host node;

receiving, by an update manager, an updated software, wherein the updated software comprises an updated process application, the updated process application being at least one of an updated version of the first process application, and an updated execution engine, the updated execution engine being an updated version of the first execution engine;

wherein the update manager is a second software container deployed in the deployment unit;

initializing, by the update manager, the updated software in a second execution engine, wherein the second execution engine is a third software container deployed in the deployment unit;

determining, by the update manager, an application state of the first process application;

instructing, by the update manager, a transfer of the application state from the first execution engine to the second execution engine via inter-process communication, wherein instructing the transfer of the application state from the first execution engine to the second execution engine comprises:

pausing, by the update manager, the execution of the first process application;

instructing, by the update manager, the first execution engine to store the application state on the shared memory;

instructing, by the update manager, the second execution engine to load the application state from the shared memory; and de-pausing, by the update manager, the execution of the first process application;

instructing, by the update manager, the second execution engine to execute the updated process application using the received application state; and instructing, by the update manager, the first execution engine to stop writing output signals for the process device, and instructing the second execution engine to write the output signals for the process device.

2. The method of claim 1, wherein the first process application comprises a predetermined cycle time, wherein the predetermined cycle time defines a frequency of periodically executing the first process application and writing the output signals for the process device; wherein a time for transferring the application state from the first execution engine to the second execution engine, executing the updated process application and writing the output signals for the process device by the second execution engine is within the predetermined cycle time.

3. The method of claim 2, wherein the predetermined cycle time is smaller than 100 ms.

4. The method of claim 1, wherein the application state comprises variables that have been set by the first process application during execution.

5. The method of claim 1, wherein the inter-process communication between the first execution engine and the second execution engine is provided by using a shared memory, shared by the first execution engine and the second execution engine.

6. The method of claim 1, wherein initializing the updated process application comprises:

initializing the second execution engine; and transferring the updated process application to the second execution engine.

7. The method of claim 1, wherein initializing the updated software comprises enabling the second execution engine to read input signals provided by the process device controlled by the first process application.

8. The method of claim 1, wherein determining the application state comprises filtering the application state for retained variables, the retained variables being variables that are necessary for a correct execution of the updated software.

9. The method of claim 1, wherein storing the application state on the shared memory comprises compressing, by the first execution engine, the application state and storing the compressed application state on the shared memory.

10. The method of claim 9, wherein loading the application state from the shared memory comprises loading, by the second execution engine, the compressed application state from the shared memory and decompressing the compressed application state.

11. The method of claim 1, further comprising:

verifying the output signals of the second execution engine based on the output signals of the first execution engine; and at times when it is determined that the output signals of the second execution engine are reliable, instructing, by the update manager, the first execution engine to stop writing the output signals for the process device, and instructing the second execution engine to write the output signals for the process device; or at times when it is determined that the output signals of the second execution engine are unreliable, deactivating, by the update manager, the second execution engine.

12. A system for real time updating of process applications, comprising:

an application engineering tool;

a process device having a hardware processor;

a container deployment unit, the container deployment unit comprising:

a first execution engine executing a first process application thereby controlling a process device, wherein the first execution engine is a first software container deployed in a deployment unit, wherein software containers of the deployment unit are deployed on a single physical host node;

an update manager receiving an updated software, wherein the updated software comprises an updated process application, the updated process application being at least one of an updated version of the first process application, and an updated execution engine, the updated execution engine being an updated version of the first execution engine;

wherein the update manager is a second software container deployed in the container deployment unit;

initializing, by the update manager, the updated software in a second execution engine, wherein the second execution engine is a third software container deployed in the container deployment unit;

determining, by the update manager, an application state of the first process application;

instructing, by the update manager, a transfer of the application state from the first execution engine to the second execution engine via inter-process communication;

instructing, by the update manager, the second execution engine to execute the update using the received application state;

instructing, by the update manager, the first execution engine to stop writing output signals for the process device, and instructing the second execution engine to write the output signals for the process device;

verifying the output signals of the second execution engine based on the output signals of the first execution engine; and at times when it is determined that the output signals of the second execution engine are reliable, instructing, by the update manager, the first execution engine to stop writing the output signals for the process device, and instructing the second execution engine to write the output signals for the process device; or at times when it is determined that the output signals of the second execution engine are unreliable, deactivating, by the update manager, the second execution engine, wherein the application engineering tool is configured for providing an updated software to the container deployment unit;

wherein the container deployment unit is configured for controlling the process device; and wherein the process device is configured for being controlled by the container deployment unit.

\* \* \* \* \*